United States Patent [19]
Zauderer

[11] 3,851,195
[45] Nov. 26, 1974

[54] BOUNDARY LAYER CONTROL AS A MEANS OF INCREASING POWER OUTPUT OF SUPERSONIC MHD GENERATORS

[75] Inventor: Bert Zauderer, Bala Cynwyd, Pa.

[73] Assignee: The United States of America as represented by the Secretary of the Navy, Washington, D.C.

[22] Filed: Aug. 29, 1973

[21] Appl. No.: 392,607

Related U.S. Application Data

[63] Continuation of Ser. No. 257,216, May 26, 1972, abandoned.

[52] U.S. Cl. .................................................. 310/11
[51] Int. Cl. .......................................... H02k 45/00
[58] Field of Search ..... 310/11; 417/50; 73/199 FM

[56] References Cited
UNITED STATES PATENTS
3,261,993  7/1966  Keating, Jr............................ 310/11
3,482,123  12/1969  Covert................................. 310/11

*Primary Examiner*—Donovan R. Duggan
*Attorney, Agent, or Firm*—R. S. Sciascia; P. Schneider

[57] ABSTRACT

The present invention eliminates the possibility of shock wave formation and boundary layer separation in MHD generators which reduces the efficiency of these devices. The generator is operated at constant velocity or Mach number to remove the possibility of shock formation. Boundary layer suction is employed to prevent flow separation which would otherwise result in a constant velocity generator, and the generator walls are movable and controlled by a computer which changes the wall position as the load changes.

10 Claims, 4 Drawing Figures

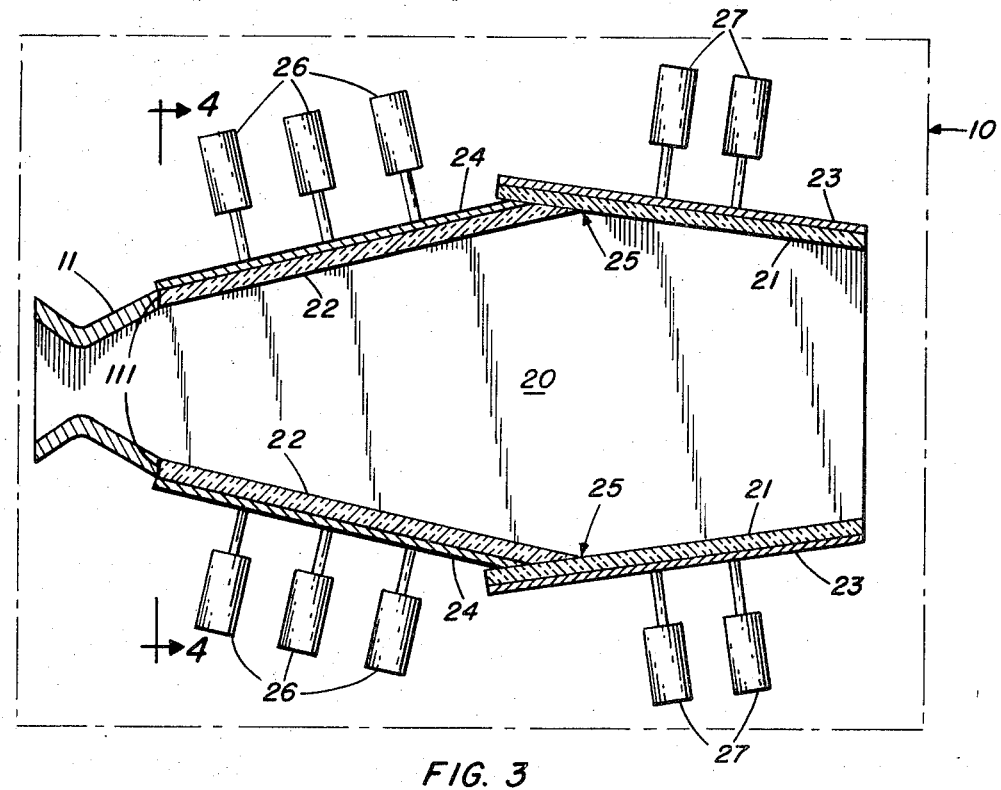
FIG. 3
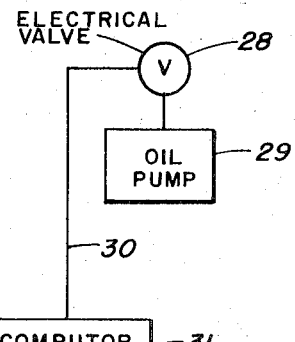
FIG. 4
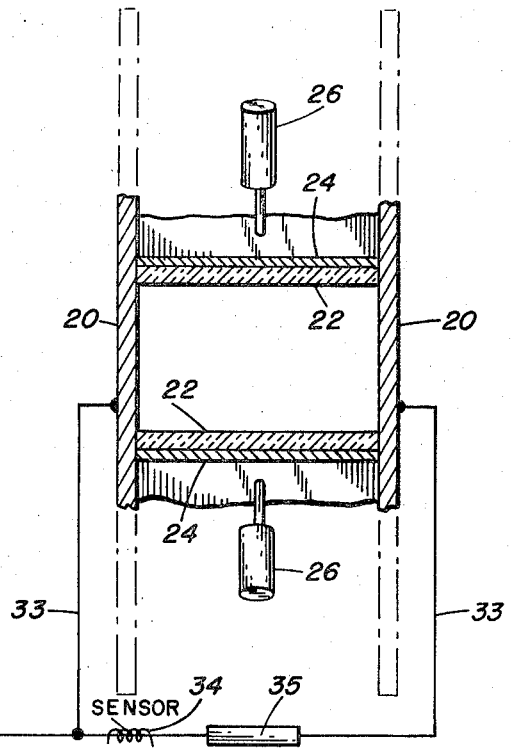

BOUNDARY LAYER CONTROL AS A MEANS OF INCREASING POWER OUTPUT OF SUPERSONIC MHD GENERATORS

This is a continuation of application Ser. No. 257,216, filed 26 May 1972, now abandoned.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The invention relates generally to magnetohydrodynamic generators, hereinafter referred to as MHD generators, and more particularly to means for increasing the efficiency of MHD generators.

2. Description of the Prior Art

Movement of an electrically conductive material through a transverse magnetic field and specifically, the interaction of the moving conductor with the magnetic field results in the establishment of electrical voltage potentials in the conductive material. A device based on this principle, in which a conductive fluid comprises the moving electrically conductive material, is generally referred to as a MHD generator. Descriptions of MHD generators may be seen in the articles Magnetohydrodynamic Generation of D.C. Electrical Power by G. W. Sutton in Vol. 5, No. 1, of Direct Current, June 1960 and Performance of a Large Scale, Nonequilibrium MHD Generator with Rare Gases by B. Zauderer and E. Tate in the AIAA Journal Vol. 9, No. 6, June 1971, pp. 1136–1143. Descriptions of MHD generators may also be seen in U.S. Pat. No. 3,525,000 to Zauderer, and the patents and publications disclosed therein.

To achieve the maximum power output from MHD generators it is necessary that no shock waves or separated boundary layers exist in the generator. The presence of a shock wave causes two detrimental effects. Firstly, the boundary layer is separated downstream of the shock wave. A separated boundary layer causes a drop in power output due to increased electrode voltage losses and due to increased gas turbulence which increases the entropy. Secondly, downstream of the shock wave the gas flow is subsonic. As a result, the induced field will drop to a low value. Consequently, the power output will be reduced. In non-equilibrium generators the induced field in the subsonic region downstream of the shock could be insufficient to maintain the plasma in a non-equilibrium state.

One method of eliminating a shock wave is to continuously expand the flow in the generator so that that velocity or Mach number increases slightly in the downstream direction. However, calculations of magnetohydrodynamic channel flow in which the constant velocity assumption is incorporated show that the channel walls must diverge at such a rapid rate that the flow will separate from the walls. This flow separation which leads to the formation of a free jet is a well known phenomena which occurs in supersonic nozzles. In the MHD generator the flow separation resulting from too great a divergence of the channel walls can, in theory, be eliminated by lengthening the power extraction region. This can be seen as follows:

A measure of the power extraction from the gas is the interaction parameter which is defined as $\overline{J} \times \overline{B} \cdot L/\rho U^2$. The vector product $\overline{J} \times \overline{B}$ is the Lorentz force where J is the current density and B is the magnetic field. $\rho$ is the gas density and U, the gas velocity. L is the generator length. By increasing L we can reduce the Lorentz force and thus the divergence of the channel could be accomplished gradually. Hence, if the gas velocity were constant, no shock waves would form and the gas flow would not separate from the walls. Unfortunately, this is an unacceptable solution since the longer the channel, the thicker the boundary layers, and the greater the wall friction losses.

This invention utilizes boundary layer suction as a solution to the problem of flow separation resulting from large divergence angles of the generator walls. Specifically, the suction holes should be located primarily in the two electrode walls since it is on these two walls that the adverse pressure gradients from the Lorentz force are greatest. Another advantage of boundary layer suction is that even if a shock wave were to occur in the generator, the suction would prevent boundary layer separation downstream of the shock.

One difficulty in MHD generators design is that the gas dynamic flow characteristics depend on the load; i.e., on the percentage of electricity delivered to an external source. Thus, a particular channel divergence angle which is satisfactory for a 50% external load could cause flow separation at less than 50% external load. Two walls of the channel, preferably the insulator walls, are movable. The walls are connected to hydraulic or electrically driven jacks. The controlling circuit for the jacks are connected to a computer which is programmed to solve the MHD channel flow equations for each load condition and which computes the optimum wall configuration for each load. The computer activates the jacks to adjust the walls in response to the computor signal. U.S. Pat. No. 3,482,123 shows movable flexible electrode walls as distinguished from the rigid insulator walls of the present invention.

SUMMARY OF THE INVENTION

The elimination of shock waves and boundary layer separation is essential to achieve efficient power output from magnetohydrodynamic generators. The present invention accomplishes this by operating the generators at nearly constant velocity or Mach number. Since constant velocity or Mach number generators require large divergence angles boundary layer suction is used to prevent flow separation resulting from large wall divergence. To obtain the optimum wall slope for each fractional loading of the generator, the walls are movable and are controlled by a computer which causes the walls to move to the optimum position to achieve efficient power extraction without flow separation.

OBJECTS OF THE INVENTION

An object of the invention is to improve the efficiency of MHD generators.

Another object is to prevent shock waves in MHD generators.

A further object of the invention is to prevent boundary layer separation of the gases in MHD generators.

Other objects, advantages, and novel features of the present invention will become apparent from the following detailed description of the invention when considered in conjunction with the accompanying drawings.

BRIEF DESCRIPTION OF THE DRAWINGS

FIG. 3 is a cross-section taken at 90° with respect to the cross-section of FIG. 2 through the MHD generator of the present invention.

FIG. 4 is a cross-section taken alone line 4—4 of FIG. 3.

DESCRIPTION OF THE PREFERRED EMBODIMENTS

Figure 1:
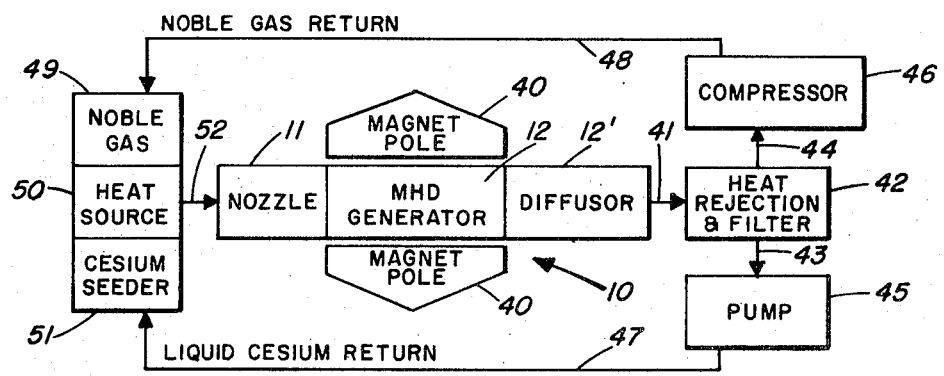
FIG. 1 shows generally a closed cycle MHD generator as used in the present invention.

FIG. 1 shows generally a MHD generator 12 with magnetic poles 40, supersonic nozzle 11, and diffuser 12'. Outlet line 41 connects the diffuser to heat rejection and filter apparatus 42. Line 43 leads to pump 45 which returns liquid cesium through return line 47 to cesium seeder 51 which connects to heat source 50. Gas line 44 leads to compressor 46 which is connected to noble gas seeder 49 through return line 48. Noble gas seeder 49 connects to heat source 50 which in turn connects to nozzle 11 through line 52. The MHD generator of the present invention is operated at a constant velocity or Mach number.

Figure 2:
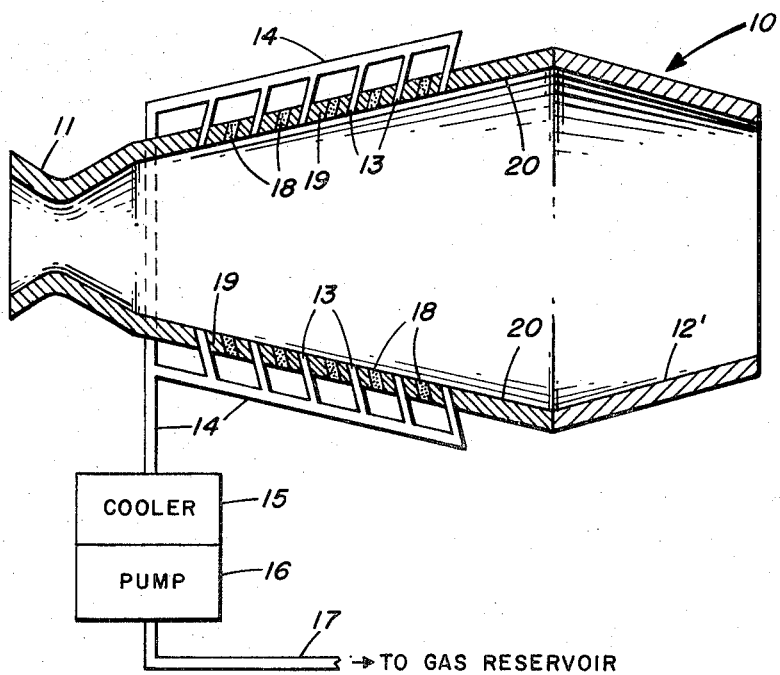
FIG. 2 is a cross-section of a MHD generator taken through the electrode walls.

FIG. 2 shows a means of controlling flow in MHD generators by utilizing boundary layer suction. The inlet is a supersonic nozzle 11 which connects to electrode walls 20 which in turn connects to the diffuser 12'. Electrodes 18 are contained in wall 20 and have insulators 19 therebetween. These walls 20, which contain the electrodes, shall hereinafter be called "electrode walls". Suction holes 13 connect to cooler 15 and pump 16 through passageways 14. The gas received by suction hole 13 is returned by the pump to a gas reservoir, not shown, through line 17.

FIG. 3 shows a means of optimizing the power conversion efficiency of a MHD generator by varying the wall relationship. Nozzle 11 is connected by a flexible joint 111 to ceramic insulator walls 22. The diffuser also has ceramic insulator wall members 21. Ceramic insulator walls 22 have metal plates 24 on the outside thereof and connect to hydraulic jacks 26. In similar fashion, ceramic insulator wall members 21 of the diffuser have metal plates 23 on the outside thereof which connect to hydraulic jacks 27. Electrical multi-way valve member 28 is connected to oil pump 29 which supplies oil through lines, not shown, to hydraulic jack members 26 and 27. Electrical valve 28 is controlled by a computer control 31 connected thereto by line 30. Electrically operated jacks controlled by computer 31 may be used instead of hydraulic ones. Computer control 31 is responsive to sensor 34 through line 32 and the controlling circuit for hydraulic jacks 26 and 27 are connected to the computer control 31 which is programmed to solve the MHD channel flow equations, referred to above, for each load condition and compute the optimum wall configuration for each load and activates the valve 28 which activates the pump 29 and the jacks to adjust the walls in response to the computer signal.

FIG. 4 shows the relationship of the electrode walls 20, insulator walls 24, and hydraulic jacks 26. The current flow in the MHD generator is illustrated through wire 33 and load 35 adjacent sensor 34, which in conjunction with the computer 31, valve 28, and hydraulic jacks 26 and 27, control the position of the insulator walls 22 and insulator wall members 21 which connect at the sliding joints 25.

Obviously many modification and variations of the present invention are possible in light of the above teachings. It is therefore to be understood that, within the scope of the appended claims, the invention may be practiced otherwise than as specifically described.

What is claimed is:

1. In a constant gas velocity magnetohydrodynamic (MHD) generator,
    a generator section having two rigid, oppositely disposed insulator walls and two rigid oppositely disposed electrode walls, said walls contacting each other to form a chamber; and
    means for moving said insulator walls to prevent the boundary layer of the ionized fluid used in said generator from separating from the chamber walls as the fluid flows through the chamber.

2. The device of claim 1, wherein said insulator and electrode walls are straight walls.

3. The device of claim 1, further including means for producing suction at the chamber side of said electrode walls, said suction means having at least one inlet on each said electrode wall.

4. The device of claim 1, wherein said means for moving said generator insulator walls is hydraulic and includes:
    means for sensing a change in generator current and producing an output corresponding thereto; and
    computer means connected to receive said output of said sensing means and to produce an output in response thereto to control the means for moving said walls, the latter being moved by such an amount as will reduce said change in generator current to zero.

5. The device of claim 1, wherein said insulator and electrode walls are straight walls, and further including means for producing suction at the chamber side of said electrode walls, said suction means having at least one inlet on each said electrode wall.

6. The device of claim 1, wherein said insulator and electrode walls are straight walls, and further including:

a diffuser forming a gas outlet for said chamber, said diffuser having two sets of rigid, oppositely disposed, insulator walls forming another chamber; and
    means for moving said set of diffuser walls which correspond to said insulator walls of the generator chamber,
    said insulator walls of both said chambers being formed with a sliding joint therebetween.

7. The device of claim 1, wherein said insulator and electrode walls are straight walls, and wherein said means for moving said generator insulator walls is hydraulic and includes:
    means for sensing a change in generator current and producing an output corresponding thereto; and
    computer means connected to receive said sensing-means output and to produce an output in response thereto to control the means for moving said walls, the latter being moved by such an amount as will reduce said change in generator current to zero.

8. The device of claim 1, wherein said insulator and electrode walls are straight walls, and further including means for producing suction at the chamber side of said electrode walls, said suction means having at least one inlet on each said electrode wall, said means for producing suction comprising:
- a pump;
- means for cooling gas, said means being connected to said pump;
- a gas reservoir; and
- conduit means connecting said cooling means to said suction inlets in said electrode walls and connecting said pump to said gas reservoir.

9. A magnetohydrodynamic generator comprising:
- a chamber formed by rigid electrode walls and insulator walls, said electrode walls having suction means to prevent boundary layer separation;
- said suction means comprising a pump, means connected to said pump for cooling gas, and a conduit connecting said pump to a gas reservoir;
- a nozzle forming a gas inlet to said chamber;
- a diffuser forming a gas outlet to said chamber; and
- means for moving said insulator walls to prevent shock wave formation.

10. A magnetohydrodynamic generator comprising:
- a chamber formed by rigid electrode walls and rigid insulator walls;
- a nozzle forming a gas inlet to said chamber;
- a diffuser forming a gas outlet to said chamber, said diffuser having rigid insulator wall members; and
- means for moving said insulator walls to prevent shock wave formation, a sliding joint being formed between said insulator wall members of said diffuser and said insulator walls of said chamber.

* * * * *